April 5, 1960   G. BEELITZ   2,931,917
APPARATUS FOR DETERMINING THE WIDTH OF A METAL STRIP
Filed Jan. 6, 1958   7 Sheets-Sheet 1

INVENTOR
Guenter Beelitz
by:
Michael S. Striker
Attorney

April 5, 1960  G. BEELITZ  2,931,917
APPARATUS FOR DETERMINING THE WIDTH OF A METAL STRIP
Filed Jan. 6, 1958  7 Sheets-Sheet 2

INVENTOR
Günter Beelitz
by
Michael S. Striker
Attorney

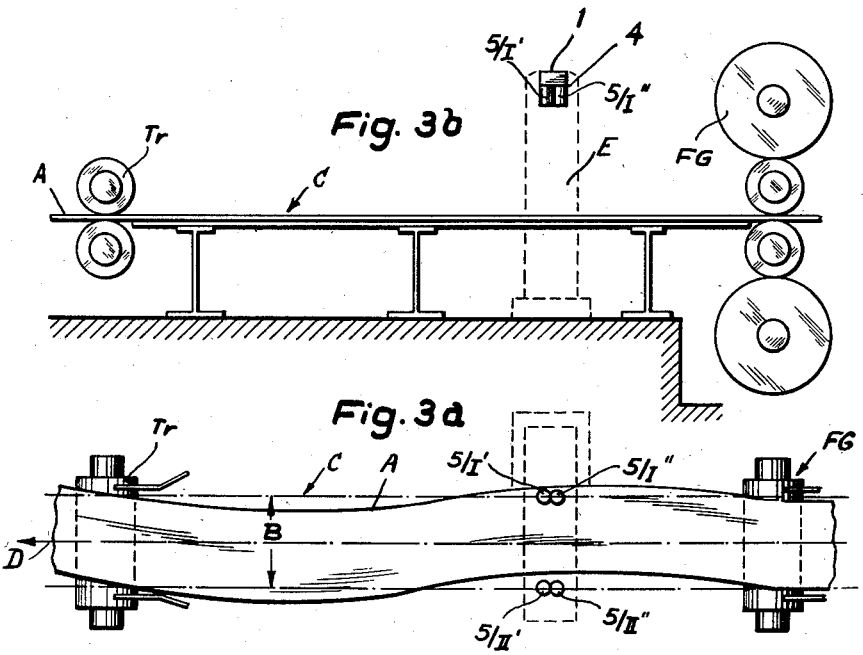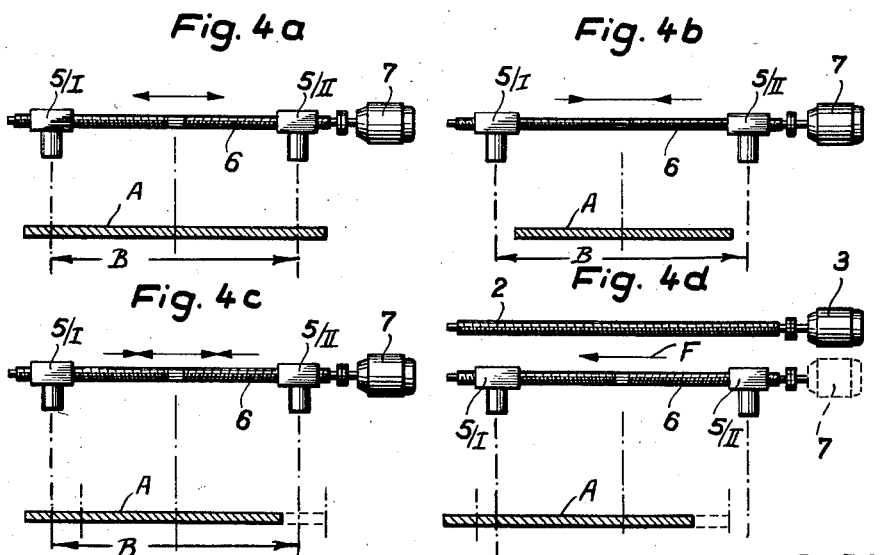

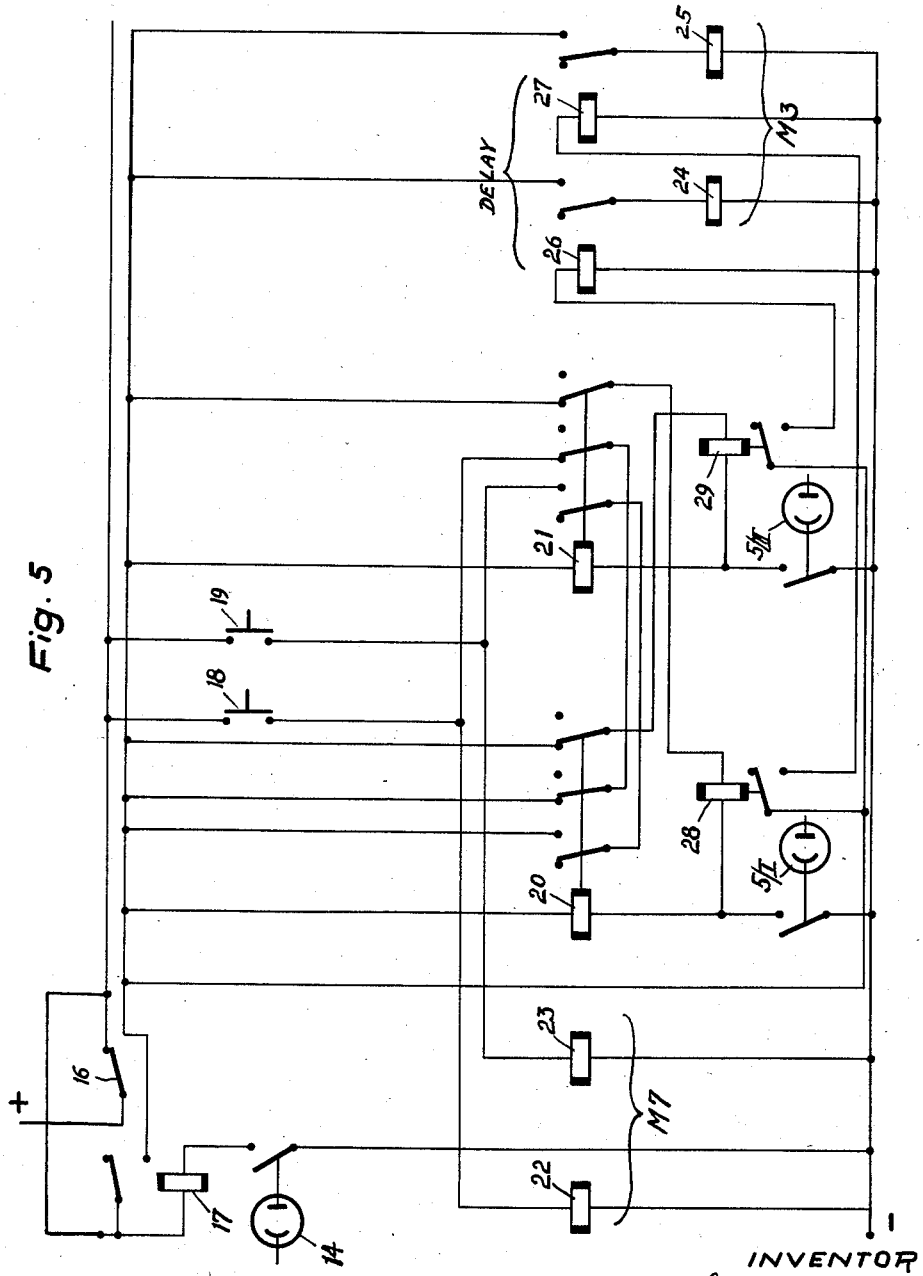

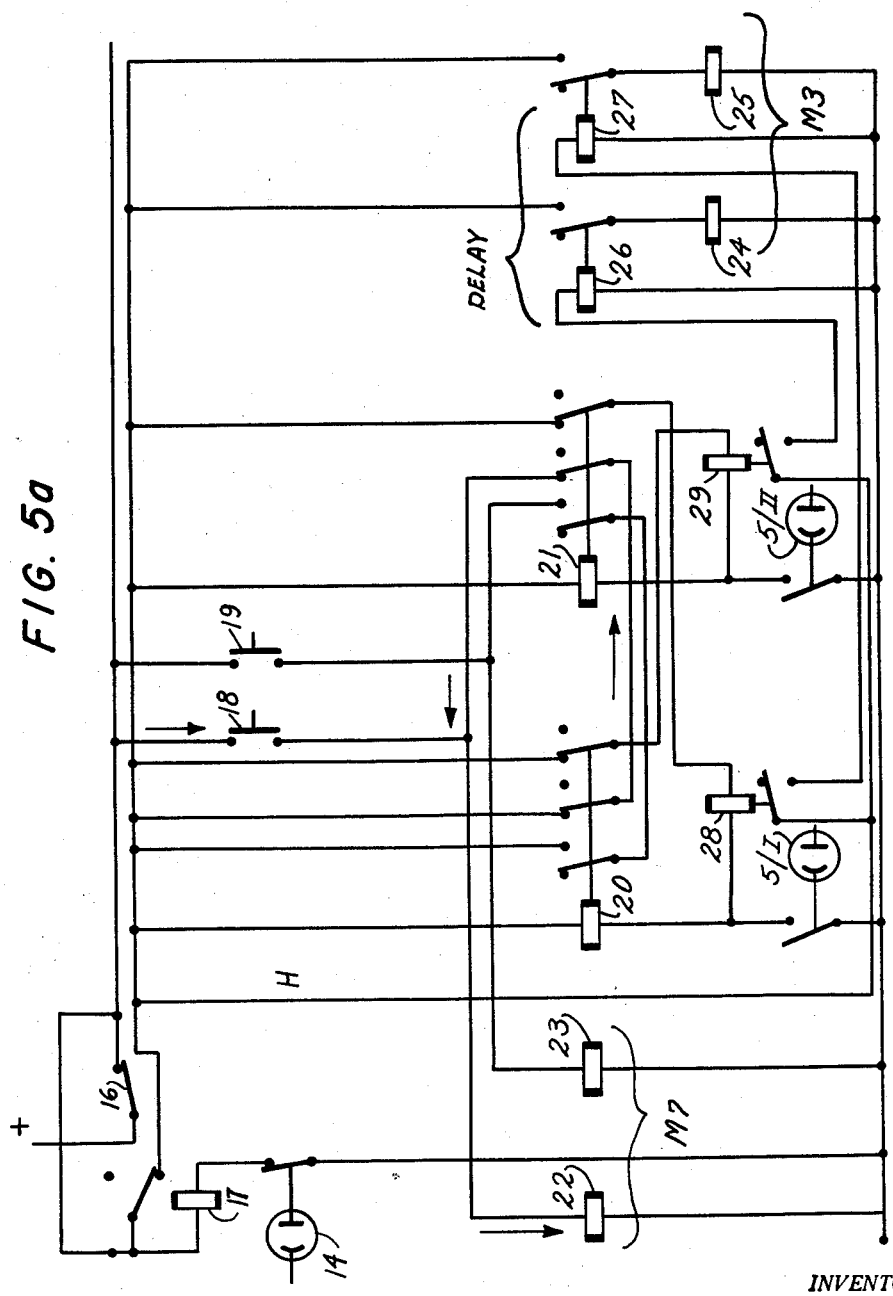

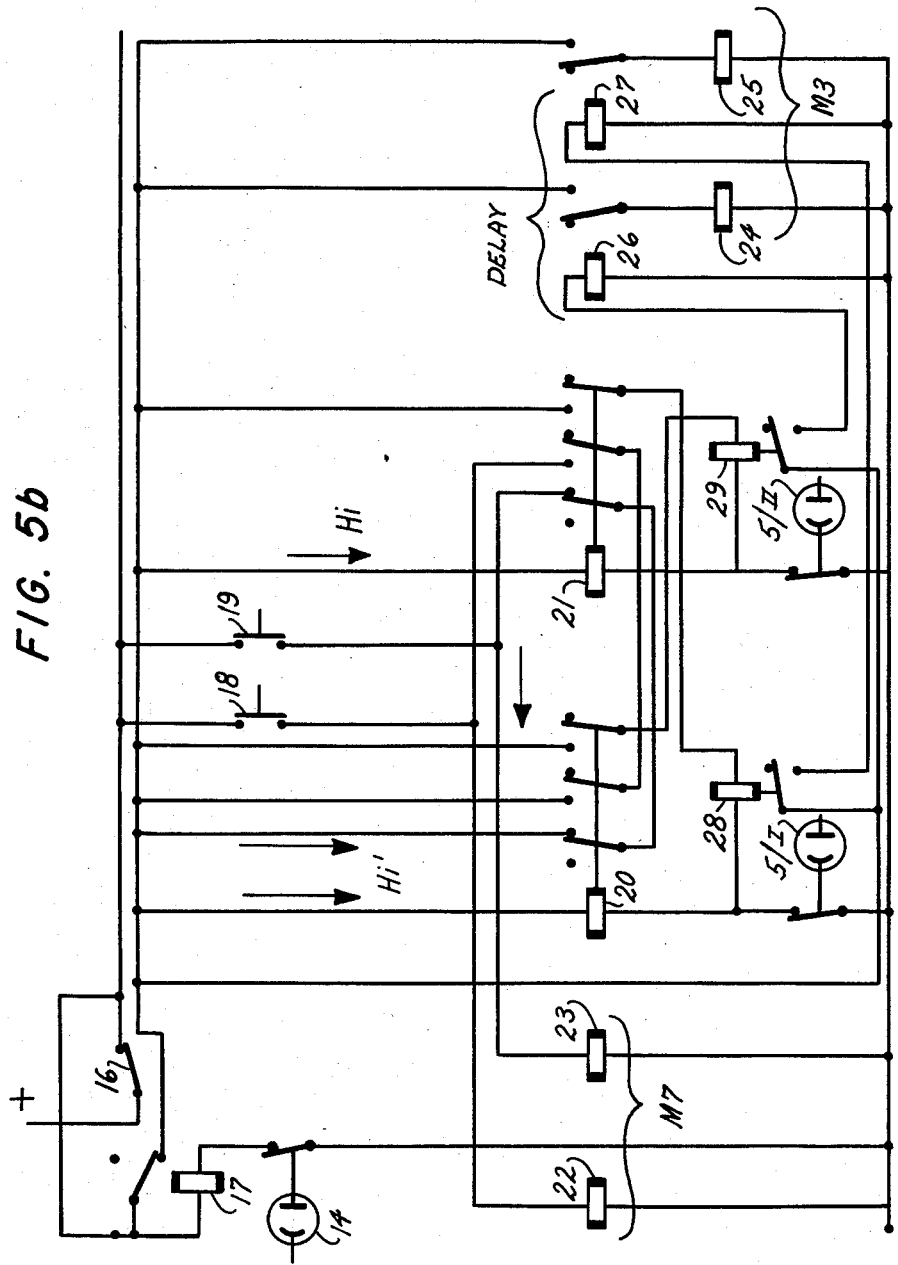

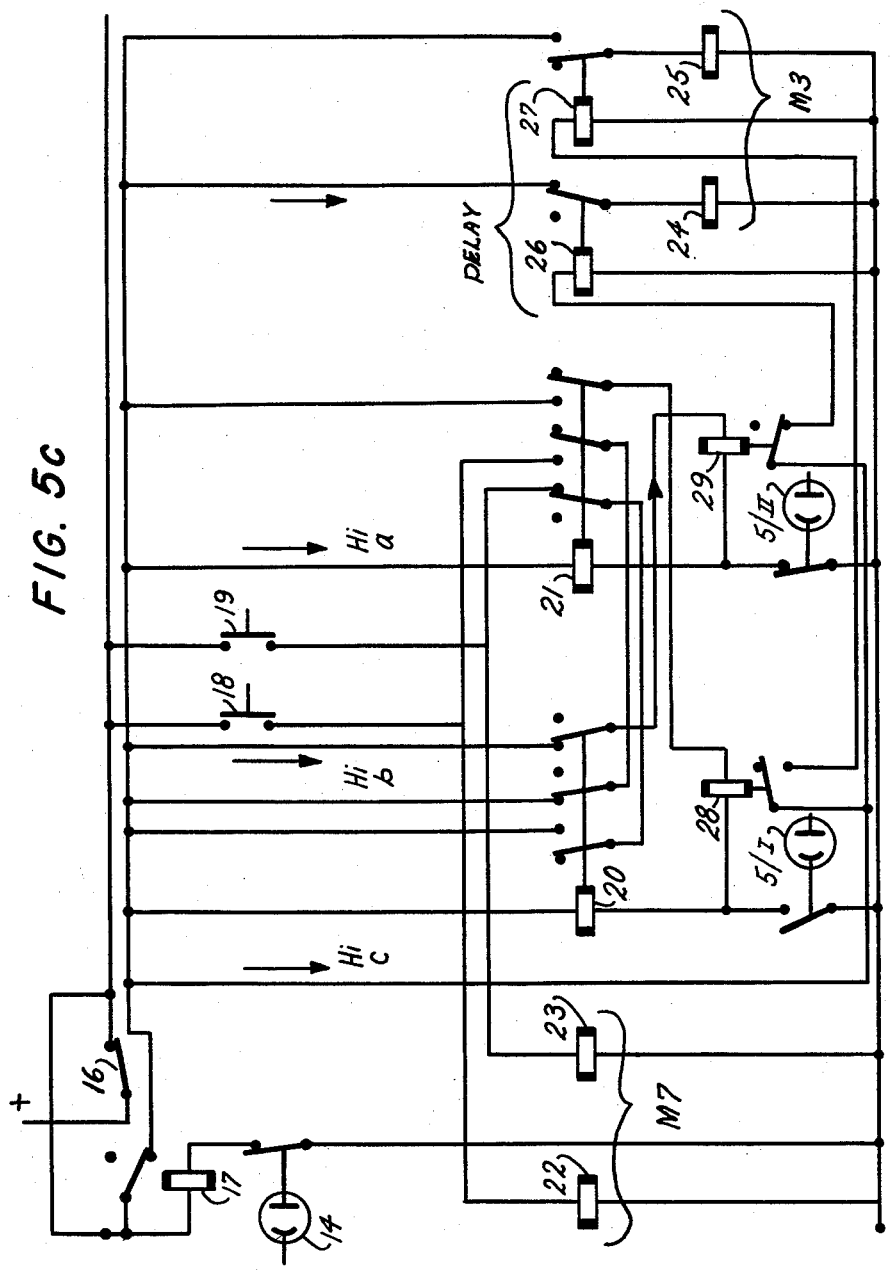

United States Patent Office 2,931,917
Patented Apr. 5, 1960

2,931,917

APPARATUS FOR DETERMINING THE WIDTH OF A METAL STRIP

Günter Beelitz, Letmathe, Westphalia, Germany

Application January 6, 1958, Serial No. 707,245

Claims priority, application Germany January 7, 1957

4 Claims. (Cl. 250—219)

The present invention refers to apparatus for determining the width of a metal strip, and more particularly to apparatus for determining the width of a moving incandescent metal strip, taking into consideration lateral deviations thereof from a predetermined path of longitudinal movement.

Apparatus of the type set forth is of particular importance and value in rolling mills where metal strips are rolled in red-hot condition. Quite evidently it is highly desirable to continuously check on the width of the strip while it is moving at considerable speed from the rolling mill proper along a predetermined path through the room. It is quite evident that any mechanical measuring means that have to be applied by hand would not give satisfactory results and in the best case would slow down production considerably and might reduce the quality of the product of the mill on account of inevitable inaccuracies of measurement.

On the other hand, an apparatus of the type contemplated that would automatically and instantaneously measure the width of the incandescent moving strip of metal would not only improve the quality of the product by keeping the tolerances closely within given limits but also speed up and facilitate production because the determined width of the strip could not only be indicated for visual information but also directly applied for adjusting the pertaining rolling units of the rolling mill for correcting any undesired deviation from standard or desired width of the strip.

It is generally known to determine the width of incandescent metal strips in rolling mills by means of photoelectric devices installed for scanning the edges of the moving metal strip. However, the known devices of this type have been developed chiefly for conditions occurring in mills producing comparatively wide strips of metal. Conditions are unfortunately different in mills producing narrow or particularly very narrow strips of metal, for instance in the range between approximately 4 inches and 24 inches because in this type of manufacture the speed of the rolling operation and therefore the speed of movement of the metal strip is considerably higher. Another feature that has to be taken into consideration is that on account of this higher speed of movement of the incandescent metal strip a lateral movement amounting almost to an oscillation of irregular frequency is usually observed which greatly increases the difficulties of measuring, and even of photoelectrically measuring the width of the moving strip. In addition, in the cases of narrow and thin strips, considerable changes in variation of the intensity of the luminous radiation from the incandescent strips is observed which variations are due to irregular and unpredictable cooling of certain portions of the strip.

It is therefore a main object of this invention to provide an apparatus for continuously determining the width of a moving incandescent metal strip, taking into consideration lateral deviations thereof from a predetermined path of the longitudinal movement of the strip.

It is another object of this invention to provide for an apparatus of the type set forth which operates completely automatically and can be used as well for a visual indication of the measured width of the moving strip, and for automatically controlling the adjustment of the mill units in order to correct any undesired deviation of the width of the strip from a desired standard.

It is still another object of this invention to provide for an apparatus of the type set forth in which the photoelectric means are provided in such a manner that even variations in the intensity of the luminous radiations from the strip would not interfere with the desired operation of the apparatus.

With above objects in view, a preferred embodiment of the invention consists in an apparatus for the purpose stated above, comprising, in combination, at least one pair of photoelectric means adapted to respond to luminous radiation emanating from opposite edge portions of said incandescent strip, each of said photoelectric means being arranged spaced from each other on opposite sides, respectively, of said predetermined path at a selected point thereof; First support means for supporting independently each of said photoelectric means at a distance from said path, in a plane substantially parallel with the general plane of said strip; first electrical moving means for simultaneously moving each of said photoelectric means with said first support means equal distances in either one of two directions, away from or towards each other, in said plane; second support means for supporting said first support means; second electrical moving means for moving said second support means in either one of two directions transverse to said path in a plane substantially parallel with said general plane; circuit means connecting said photoelectric means and said moving means for actuating the latter in a predetermined sequence depending upon the response of said photoelectric means to said radiation of said strip; and indicator means connected to said first support means for indicating the distance between said photoelectric means, said distance being at any time a function of the width of said strip passing said selected point of its path.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 3a and 3b illustrate diagrammatically in plan view and elevation, respectively, a layout of a rolling mill including the installation of the apparatus according to the invention;

Figures 4a, 4b, 4c, 4d illustrate diagrammatically four characteristic conditions of operation which have to be handled by the apparatus according to the invention;

Figure 5 is a circuit diagram illustrating diagrammatically the essential circuit means that may be used for operating the apparatus according to the invention;

Figures 5a, 5b and 5c illustrate the same circuit means as shown in Figure 5, but in typical conditions and positions of their components corresponding to the operating conditions illustrated by Figures 4a–4d.

Referring now to Figures 1 to 4d and particularly to Figures 3a and 3b, it can be seen that the apparatus according to the invention is applied to a hot rolling mill arrangement of which the last set of rollers FG force a metal strip A in the direction indicated by the arrow D over a predetermined path or guiding arrangement C towards a set of trimming rollers or any other implement Tr. It should be noted that the arrow D at the same time symbolizes the center line of the predetermined path for the strip A. The strip A is supposed to be produced with a standard width or predetermined width B. At a selected point along the path C, D the apparatus according to the invention is mounted on some framework E shown only diagrammatically in dotted lines.

Figure 1:
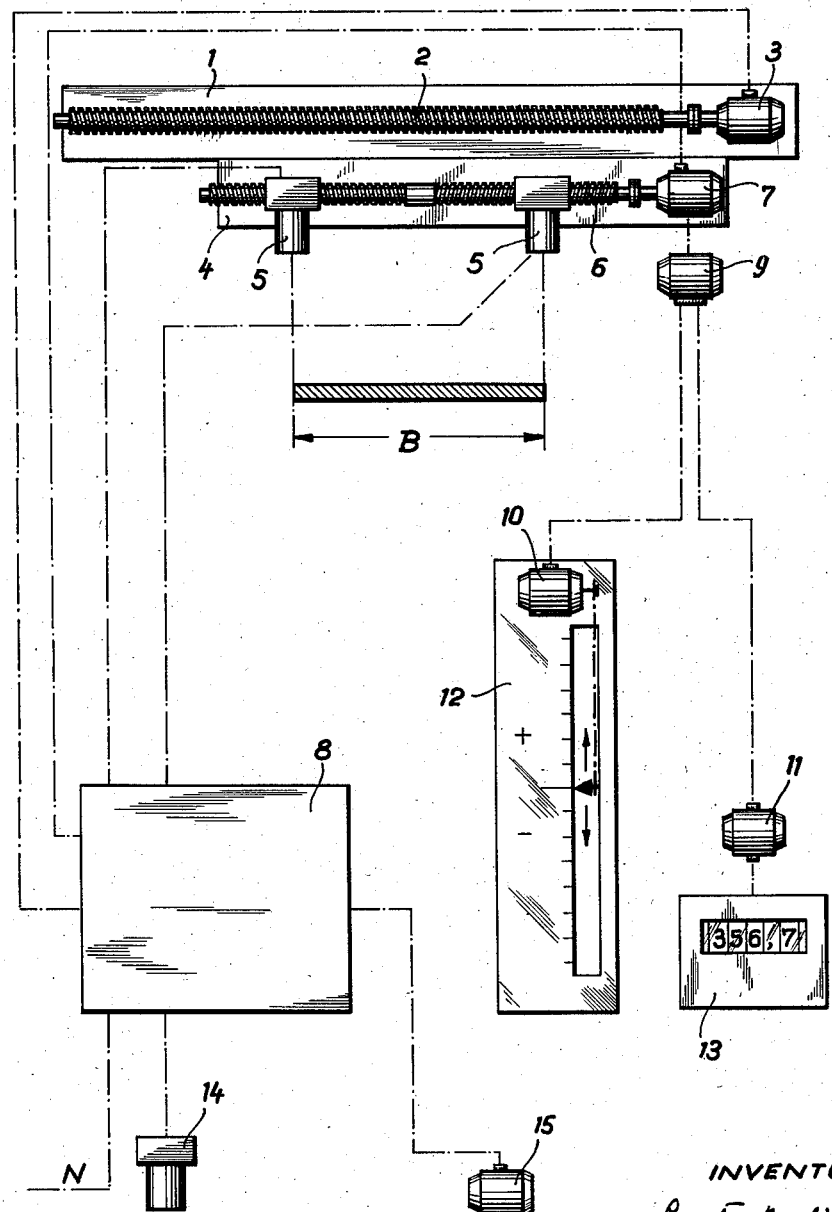
Figure 1 is a diagrammatic illustration of an arrangement incorporating an apparatus according to the present invention for determining the width of a metal strip.

As can be seen more clearly in Figure 1 and in Figure 3b the apparatus according to the invention comprises two photoelectric devices 5/I and 5/II. Figure 1 in its upper portion being substantially an elevation, shows the strip A in cross section. As can be seen the two photoelectric devices 5/I and 5/II are mounted on opposite sides of the center line D of the theoretical path C in a horizontal plane, i.e., a plane substantially parallel with the general plane of the strip A. The two photoelectric devices 5/I and 5/II are supported by support means which include a spindle 6 carried for rotation in a frame 4. The spindle 6 is in a threaded engagement with the housings of the photoelectric devices 5/I and 5/II and has two portions provided with threads with opposite pitch, i.e. a left-handed thread portion and a right-handed thread portion so that whenever the spindle 6 is rotated the two photoelectric devices are caused to move in directions opposite to each other. The frame 4 carries electrical moving means as for instance a reversible motor 7 coupled with the spindle 6. The frame 4, hereinafter called first support means, is supported by a second support means constituted by a frame 1 containing a spindle 2 coupled with a reversible electrical motor 3. The frame 1 and the spindle 2 are hereinafter called the second support means and are connected with the first support means 4 in any conventional manner permitting to move the whole frame 4 together with the photoelectric devices in one or the other direction along the frame 1 whenever the spindle 2 is rotated by the motor 3.

Figure 2:
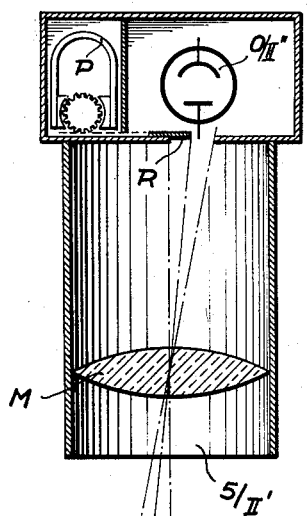
Figures 2, 2a and 2b, illustrate diagrammatically details of a special form of the photoelectric equipment that could be used in connection with the present invention.

In Figure 3a the photoelectric devices 5/I and 5/II have been shown subdivided into two elements each as for instance 5/I′ and 5/II″, for reasons which will be explained below when describing Figure 2.

For the purpose of simplifying the description of this apparatus, it may be assumed that in the position illustrated in Figure 1 where the optical axes of the two photoelectric devices 5/I and 5/II are tangent to the outer edges of the strip A having the standard width B, and in which position these two photoelectric devices are spaced from each other also the distance B, conditions are what may be called "critical." With this term it is intended to say that if now the width B of the strip A passing underneath the photoelectrical devices would change so as to become narrower then both photoelectric devices would not obtain any radiation anymore sufficient to induce a current therein or permit the passage of a current therein. However, if the width of the strip A passing underneath the photoelectric devices would increase so as to become larger than the standard B then both photoelectric devices 5/I and 5/II would obtain radiation from the edge portions of the strip A projecting outwardly beyond the optical axes of the respective devices so that both of them would respond and cause certain operations through the attached circuits. Figures 4a and 4b illustrate these two cases. As indicated by Figure 4a the strip A is wider than the dimension B. Therefore both photoelectric devices 5/I and 5/II respond to the radiation impinging upon them and therefore cause the motor 7 to turn the spindle 6 in such a direction that the two photoelectric devices 5/I and 5/II are moved in opposite directions away from each other as shown by the arrows. Exactly the opposite is the case according to Figure 4b where the strip is narrower than B so that the photoelectric devices are both not impinged upon by radiation which causes the motor 7 to turn the spindle 6 in opposite direction than before so that consequently the photoelectric devices are moved in opposite direction towards each other as also indicated by arrows.

It is quite evident that these two typical operations or responses of the apparatus to varying widths of the strip A would automatically cause the photoelectric devices 5/I and 5/II to follow any such variation of width and thereby to indicate automatically to an observer which is at any time the width of the strip A because the distance between the optical axes of the two photoelectric devices is assumed to be identical or at least a function of the actual width of the strip A.

As is illustrated diagrammatically in Figure 1, the moving means or the motor 7 may be operatively connected with remote control means comprising a transmitter 9, e.g. a synchronous generator, connected by lines indicated by dot-dash lines with synchronous motors 10, 11, one of which may move indicator elements along a large visible plus-minus scale 12, while the other one may operate a visual numerical indicator or counter device 13. However it may be stated in this context that the control means 9 might as well be connected to other devices which immediately control the adjustment of at least the last unit of the milling rollers FG in order to correct the deviation in width that may have been detected by the apparatus. Instead of adjusting the rollers FG other elements of the mill machinery may be adjusted as well in order to bring about the required correction. A control box 8 contains all the components which together with connecting lines shown in Figure 1 constitute circuit means for transmitting the various responses from the photoelectric devices 5/I and 5/II to the moving means 3 and 7. The same control box 8 may also contain other control means as for instance a photoelectric device 14 which will be described further below, and means for operating a device 15 which may be also one of those devices which automatically carry out necessary adjustments of the rolling mill equipment for adjusting the width of the strip being processed, in the manner generally described above.

It should be noted that the dot-dash lines in the diagram of Figure 1 symbolize electrical lines having as many wires as there may be required for operatively connecting the various components of the whole arrangement.

Referring again to Figures 4a–4d, it can be seen that in addition to the standard or basic cases illustrated by Figures 4a and 4b, there are two more possibilities of operational conditions as shown by Figures 4c and 4d. Figure 4c illustrates the case where the width of the strip A is correct and substantially equal to the standard width B. However, the strip A has temporarily shifted sideways to the left has seen in this illustration. In this case no adjustment of the position of the two photoelectric devices is carried out by the apparatus because a certain arrangement of time delay elements prevents such action provided the lateral shift of the strip A does not last longer than a predetermined period of time. If this were not done continuous slight deviations or wavering of the strip A from the theoretical path D, which are almost inevitable, would cause a continuous operation back and forth of the various moving means of the apparatus without being necessary.

The case of Figure 4d however is that which occurs when the deviation of the strip A from the theoretical pass D lasts longer than the predetermined period controlled by the time delay elements described. In that case one of the photoelectric devices namely the unit 5/I responds to the radiation emanating from the strip A while the other unit 5/II is without response because no radiation impinges upon it. In that case through the electric circuits described below the moving means or motor 3 is caused to move the spindle 2 in such a manner, as shown by the arrow F, that the two photoelectric devices 5/I and 5/II become again centered or substantially centered above the displaced strip A.

Figure 5 illustrates diagrammatically the principal circuit means that may be used in connection with the apparatus described above.

A manual switch 16 is a main switch for placing the whole circuit in connection with the supply of electrical energy and to make it ready for operation. Nevertheless the circuit is still not connected to the network because a relay switch 17 is normally in open condition. As can be seen the photoelectric device 14 mentioned above interrupts the circuit that would actuate the relay switch 17. It should be assumed that the photoelectric device 14 is located somewhere along the path C of the whole arrangement so that this switch 17 is actuated only when an incandescent strip A comes forward from the rolling equipment.

The motor 7 is controlled by relay switches not shown entirely, but the coil 22 of one and the coil 23 of the other relay is shown in the diagram and connected by a bracket marked M7. The relay coil 22 when energized closes a switch causing the motor 7 to turn in one direction while the coil 23 acts similarly but causes the motor 7 to turn in the reverse direction. In a similar manner coils 24 and 25 marked by the bracket M3 serve to actuate switches which control the motor 3. When the coil 24 is energized the motor 3 is caused to turn in one direction, and when the coil 25 is energized the motor 3 is caused to turn in the opposite direction.

The coils 26 and 27 are time delay devices which close the pertaining switches only after a certain predetermined delay.

The photosensitive device 5/I controls by its switch a circuit containing the coil 20 of a three-pole relay while in the similar manner the photosensitive device 5/II controls by its switch a circuit containing the coil 21 of another three-pole relay. The auxiliary relay switches 28 and 29 are connected in the circuit for controlling the operation of the time delay devices 26, 27. Finally the push button switches 18 and 19 are connected in circuit with the relays 22, 23 for arbitrarily moving the spindle 6 by means of motor 7 in one or the other direction so as to arbitrarily set the photoelectric devices 5/I and 5/II for a particular dimension or distance B.

Referring now to Figure 5a, the operation of the apparatus in the case illustrated by Figure 4a is described. In this case the width of the strip A is greater than the standard or desired width B. It is therefore necessary that the motor 7 actuate the spindle 6 in such a manner that the distance between the photoelectric devices 5/I and 5/II is increased until the spacing between these devices is substantially equal to the width of the strip A at the particular point under observation.

In this case both photoelectric devices respond to the radiation emanating from the edge portions of the strip A. Consequently, both the switches directly connected with the photoelectric devices 5/I and 5/II remain open. The coils 20 and 21 have not been energized. Therefore the triple switches connected with these two relay coils are in the position shown in Figure 5a. Consequently the current flows as follows: from the input terminal the current travels via the middle contact of the relay switch 20 to the middle contact of the relay switch 21 and further to the coil 22 of the motor relay and thereby causes the motor 7 to start in one predetermined direction which causes the spindle 6 to rotate in such a manner that the two photoelectric devices 5/I and 5/II move in opposite directions away from each other.

Referring now to Figure 5b, the case is considered which is illustrated by Figure 4b. In this case the width of the strip A is less than the actual distance between the two photoelectric devices 5/I and 5/II. Therefore, it is necessary to cause the motor 7 to turn the spindle 6 in such a manner that the distance between the photoelectric devices is reduced until this distance is equal with the actual width of the strip A. As can be seen from Figure 4b, in this case none of the two photoelectric devices has to respond to any radiation. Therefore the pertaining switches are in closed position as indicated in Figure 5b. Therefore, the coil 20 and the coil 21 of the three-pole switches are both energized and both switches are thrown into their second operative position as indicated in Figure 5b. Now the current flows via the left-hand contact of relay 20 and the left-hand contact of relay 21 to the motor relay 23 whereby the motor 7 is actuated but is caused to rotate in opposite direction than before so that the spindle 6 is turned in such a manner that the two photoelectric devices 5/I and 5/II are moved toward each other.

The case illustrated by Figure 5c corresponds chiefly to the condition illustrated by Figure 4d. In this case the strip B is assumed to have shifted to the left so as to move its irght-hand edge out of the area from which the photoelectric device 5/II could obtain any radiation. Therefore it is necessary that the whole supporting means 4 i.e., both photoelectric devices 5/I and 5/II conjointly, are moved to the left in order to centralize the supporting means 4 with respect to the strip A. This can be accomplished by operation of the spindle 2 by means of the motor 3. In order not to complicate the description it may be assumed at this moment that the width of the strip has changed so that it is not necessary to also change the distance between the photoelectric devices.

In this case the photoelectric device 5/I responds to radiation while the photoelectric device 5/II does not. Therefore the switch pertaining to the last mentioned photoelectric device 5/II is in its closed position as indicated in Figure 5c and thereby closes a circuit across the coil 21 of the one three-pole relay switch. At the same time the closed position of the switch associated with the photoelectric device 5/II closes an auxiliary circuit containing the relay coil 29 of one of the auxiliary switches. Hereby the auxiliary switch connected with the coil 29 is moved into its closed position and thereby causes energization of the coil 26 of one of the time delay switches. Consequently a circuit with some time delay is closed across the coil 24 of one of the motor relays M3. Hereby the motor 3 is caused to rotate in one direction and to turn the spindle 2 in such a manner that the whole support 4 with the two photoelectric devices is moved towards the left as seen in Figure 4b.

It is evident that the conditions are quite similar or analagous in case the strip A should have shifted to the right so that the photoelectric device 5/I is not energized while only the device 5/II is energized. It is believed not to be necessary to explain the operation of the circuit means in this case but it may suffice to state that in this case the motor 3 is caused to turn in the opposite direction so that the photoelectric devices are moved towards the right.

The case illustrated by Figure 4c evidently does not call for a detailed explanation of operation of the circuit means of the Figure 5. It is assumed that in this case also the width of the strip A is substantially equal with the distance between the two photoelectric devices. Therefore the motor 7 does not have to be operated. On the other hand, although in this case the photoelectric device 5/I has been energized and responds to radiation, the short time of the deviation of the strip A from the predetermined path D does not permit the time relay switch 26 to operate as described before so that in this case no operation of the device at all would take place.

Figure 2A:
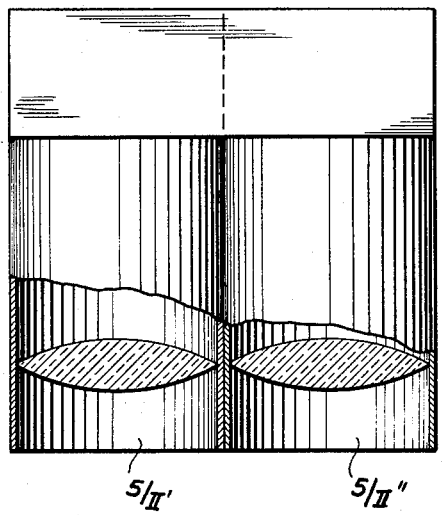
Figure 2B:
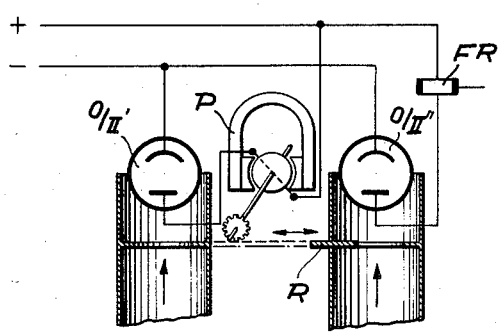
Figure 2B:
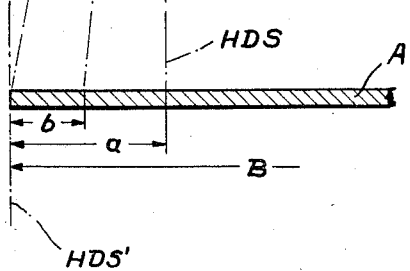

It remains now to describe briefly a possibility of modifying the equipment described above in a certain direction. It has been found that generally photoelectric cells are available now which permit very precise focusing or at least the use of a very narrow observation slot so that a very accurate relation between the optical axis of the photoelectric device and the edge of the incandescent strip can be established. Under these circumstances no special arrangements are necessary. However, in case no photoelectric cell of this above described accuracy is available, an arrangement according to Figures 2–2b may be suitable. To understand this the following should be considered. Be it assumed that the strip A moves in a direction towards left as seen in Figure 2 beyond the optical axis marked HDS. Then the optical system M transmits to the actual photo cell 0/II″ the radiation coming from the portion marked a along the strip A. Depending upon the sensitivity of the photo cell the amount a will be smaller or larger for creating a sufficient electrical impulse through the photo-cell to actuate the electrical means connected with the photo-cell. Therefore depending upon the sensitivity of the photo-cell the position of the strip A moving to the left will be at the line HDS′ before any reaction takes place. It can be easily understood that in case of variations of intensity of radiation the dimension a may change and for instance in the case of substantially higher radiation intensity the demension a may be reduced by the smaller distance b. In order to compensate for these possible variations due only to varying radiation intensity of the incandescent strip A, the photoelectric device 5/II may be composed of actually two devices 5/II′ and 5/II″ each containing a separate photo-cell 0/II′ and 0/II″ as shown in Figures 2a and 2b. The purpose of this twin arrangement is only this that the second photocell 0/II″ reacts to the intensity of the radiation so as to operate through a moving coil instrument P a shutter R which increases or decreases accordingly the slot through which radiation is transmitted to the photo-cell 0/II′. This means that the higher the intensity of the radiation, the narrower will be the slot admitting the radiation to the operative cell so that, in other words, independently of variations in intensity of radiation the position of the line HDS′ will remain at a constant distance from the line HDS which is the actual optical axis of the operative photocell 0/II′.

It will be understood that each of the elements described above, or two or more together, may also find a useful application in other types of apparatus for determining the width of metal strips differing from the types described above.

While the invention has been illustrated and described as embodied in an apparatus for determining the width of moving incandescent metal strips, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for determining the width of a moving incandescent metal strip taking into consideration lateral deviations thereof from a predetermined path of longitudinal movement, comprising, in combination, at least one pair of photoelectric means having an optical axis and being adapted to respond, by furnishing electrical impulses, to luminous radiation emanating from opposite marginal areas, respectively, of said incandescent strip, only when said optical axis intersects with one of the opposite marginal areas, respectively, of said strip, each of said photoelectric means being arranged spaced from the other one, on opposite sides, respectively, of said predetermined path at a selected point of said path; first support means for supporting independently each of said photoelectric means at a distance from said path, in a plane substantially parallel with the general plane of said strip; first electrical moving means comprising a first reversible motor mounted on said first support means for simultaneously moving each of said photoelectric means equal distances in either one of two directions, away from or towards each other, in said plane; second support means for supporting said first support means; second electrical moving means comprising a second reversible motor mounted on said second support means for moving said first support means in either one of two directions transversely to said path in a plane substantially parallel with said general plane; electrical circuit means connecting said photoelectric means and said moving means for actuating the latter in a predetermined sequence depending upon the response of said photoelectric means to said radiation from said strip, said circuit means including first switch means associated with one of said photoelectric means and second switch means associated with the other one of said photoelectric means, said switch means operable by impulses furnished by said photoelectric means for changing between a first position causing said first motor to turn in a direction effecting movement of said photoelectric means away from each other upon impulses furnished by both said photoelectric means simultaneously, and a second position causing said first motor to turn in the reversed direction effecting movement of said photoelectric means towards each other when no impulse is furnished by either one of said photoelectric means; said circuit means further including third switch means associated with said one photoelectric means and said first switch means, and fourth switch means associated with the other one of said photoelectric means and said second switch means, said third and fourth switch means being operable by impulses furnished by said photoelectric means for changing between a first position cousing said second motor to turn in a direction effecting movement of said first supporting means in the direction of an occurring deviation of said strip from said predetermined path upon an impulse furnished only by the photoelectric means located on the side of said deviation, and a second position causing said second motor to turn in the reverse direction effecting movement of said first supporting means in the direction of an oppositely directed deviation of said strip from said predetermined path upon an impulse furnished only by the photoelectric means located on the side of the latter deviation, so that in case of any occurring deviation of said strip from said predetermined path said first supporting means with the photoelectric means supported thereby are moved to be substantially centralized with respect to said strip in its deviated position; and indicator means operatively connected with said first support means for indicating the distance between said photoelectric means, said distance being at any time a function of the width of said strip passing said selected point of said path.

2. Apparatus as set forth in claim 1, including time delay means connected respectively with each of said third and fourth switch means for delaying by a predetermined amount of time the changing of said third and fourth switches between said first and second positions and vice versa, after one of said impulses is furnished for operating said third and fourth switches, respectively, so that upon occurrence of deviations of said strip from said predetermined path lasting less than said predetermined amount of time no changing of said third and fourth switch means, respectively, from one to the other of their positions is caused and consequently said first support means are not moved in the direction of such transient brief deviation.

3. Apparatus as set forth in claim 1, including an additional photoelectric means arranged adjacent to the said predetermined path of said strip so as to be exposed to luminous radiation thereof irrespective of the width of said incandescent strip and of its position relative to said predetermined path; and including switch means included in said circuit means, operable by said additional photoelectric means for changing between a first position in which said circuit is disconnected from the power supply as long as said additional photoelectric means is not irradiated by said strip, and a second position in which said circuit is connected with the power supply as soon as said additional photoelectric means is irradiated by said strip, so that the whole apparatus is rendered operative only when an incandescent strip passes said additional photoelectric means.

4. Apparatus as set forth in claim 1, wherein each of said photoelectric means comprises two photoelectric cells connected in parallel with each other in said circuit means, a moving coil instrument operatively connected with one of said photoelectric cells and operable by said photoelectric cell for producing a torque depending upon the intensity of radiation impinging upon said one photoelectric cell, and shutter means located in the path of radiation directed from said strip to said other one of said photoelectric cells and operable by said torque furnished by said moving coil instrument between a plurality of positions reducing the irradiation area of said other photoelectric cell depending upon the intensity of radiation impinging upon said photoelectric means, so that the response of said photoelectric means to irradiation from said incandescent strip remains substantially uniform irrespective of variations of intensity of such radiation.

References Cited in the file of this patent
UNITED STATES PATENTS

| | | |
|---|---|---|
| 2,489,305 | McLennan | Nov. 29, 1949 |
| 2,548,590 | Cook | Apr. 10, 1951 |
| 2,581,937 | Secrest | Jan. 8, 1952 |
| 2,730,006 | Gottschall | Jan. 10, 1956 |
| 2,791,931 | Summerhayes | May 14, 1957 |
| 2,810,316 | Snyder | Oct. 22, 1957 |

OTHER REFERENCES

Urano: Automation; March, 1956, pp. 52–57.